(12) United States Patent
Jeong et al.

(10) Patent No.: US 12,473,627 B2
(45) Date of Patent: Nov. 18, 2025

(54) SURFACE-FUNCTIONALIZED METAL FOIL AND METHOD OF PREPARING THE SAME

(71) Applicant: UNIVERSITY-INDUSTRY COOPERATION GROUP OF KYUNG HEE UNIVERSITY, Yongin-si (KR)

(72) Inventors: Sun Ho Jeong, Yongin-si (KR); Ye Jin Jo, Anyang-si (KR); Sang Hyeok Bae, Yongin-si (KR); Yeong Je Lee, Jeonju-si (KR)

(73) Assignee: UNIVERSITY-INDUSTRY COOPERATION GROUP OF KYUNG HEE UNIVERSITY, Yongin-si (KR)

( * ) Notice: Subject to any disclaimer, the term of this patent is extended or adjusted under 35 U.S.C. 154(b) by 9 days.

(21) Appl. No.: 18/341,364

(22) Filed: Jun. 26, 2023

(65) Prior Publication Data
US 2023/0416900 A1    Dec. 28, 2023

(30) Foreign Application Priority Data
Jun. 28, 2022    (KR) .......................... 10-2022-0078773

(51) Int. Cl.
C23C 10/20    (2006.01)
B32B 15/01    (2006.01)

(52) U.S. Cl.
CPC .............. *C23C 10/20* (2013.01); *B32B 15/01* (2013.01)

(58) Field of Classification Search
CPC ................................ C23C 10/20; B32B 15/01
See application file for complete search history.

(56) References Cited

U.S. PATENT DOCUMENTS

2023/0374331 A1* 11/2023 Jeong ................... B41M 5/0058

FOREIGN PATENT DOCUMENTS

| JP | 2011-249357 A | 12/2011 |
|----|---------------|---------|
| JP | 2017-073437 A | 4/2017 |
| KR | 10-2012-0132111 A | 12/2012 |

OTHER PUBLICATIONS

English machine translation of KR-10-2012-0132111 (Year: 2012).*
Zhao et al. "Gold Nanoparticle Patterning on Monomolecular Chemical Templates Fabricated by Irradiation-Promoted Exchange Reaction" J. Phys. Chem. C 2011, 115, 14058-14066. (Year: 2011).*

* cited by examiner

Primary Examiner — Robert S Walters, Jr.
(74) Attorney, Agent, or Firm — Bridgeway IP Law Group, PLLC; Sang Ho Lee; Hyun Woo Shin

(57) ABSTRACT

The present disclosure relates to a surface-functionalized metal foil and a method of preparing the same. According to the method of preparing the surface-functionalized metal foil, metal nanoparticles are adsorbed as a single layer on a metal substrate, and then the metal nanoparticles are irradiated with light to form a surface functional layer.

8 Claims, 13 Drawing Sheets

SURFACE-FUNCTIONALIZED METAL FOIL AND METHOD OF PREPARING THE SAME

CROSS-REFERENCE TO RELATED APPLICATION

This application claims priority to Korean Patent Application No. 10-2022-0078773, filed on Jun. 28, 2022, in the Korean Intellectual Property Office, the disclosure of which is incorporated herein by reference.

BACKGROUND OF THE DISCLOSURE

Field of the Disclosure

The present disclosure relates to a metal foil that is surface-functionalized by light firing after adsorption of metal nanoparticles and a method of preparing the same.

Description of the Related Art

In general, to form an alloy, heat is applied to melt two metal materials, and then a cooling process is performed. However, the heat treatment process consumes a lot of time to heat and cool the metal materials, which increases cost and reduces productivity. In addition, the characteristics of the metal materials may be lost due to oxidation of the metal materials during the long heat treatment process. Therefore, the present disclosure discloses a technique capable of obtaining a heat treatment effect through light firing of a metal substrate using metal nanoparticles and imparting functionality to the metal substrate through formation of a heterogeneous alloy.

RELATED ART DOCUMENTS

Patent Documents

Korean Patent Application Publication No. 10-2012-0132111, "METHOD OF LIGHT SINTERING OF CONDUCTIVE SILVER NANOINK"

SUMMARY OF THE DISCLOSURE

Therefore, the present disclosure has been made in view of the above problems, and it is an object of the present disclosure to induce surface functionalization of a metal film obtained by adsorbing metal nanoparticles as a single layer on a substrate.

In accordance with one aspect of the present disclosure, provided is a method of preparing a surface-functionalized metal foil, the method including preparing a surface-modified metal substrate using a first surface modifier; preparing surface-modified metal nanoparticles using a second surface modifier; immersing the surface-modified metal substrate in a solution containing the surface-modified metal nanoparticles to adsorb the metal nanoparticles as a single layer on the metal substrate; and drying the metal substrate on which the metal nanoparticles are adsorbed and then performing light firing of the metal nanoparticles to form a surface functional layer.

According to one embodiment, the metal nanoparticles may be adsorbed at a rate of 10% to 95% based on a total area of the metal substrate.

According to one embodiment, the metal nanoparticles may have a diameter of 10 nm to 200 nm.

According to one embodiment, the metal nanoparticles may include any one selected from gold, silver, copper, nickel, tin, and an alloy composition thereof.

According to one embodiment, the metal substrate may include any one selected from the group consisting of zinc (Zn), copper (Cu), nickel (Ni), aluminum (Al), stainless steel, titanium (Ti), molybdenum (Mo), gold (Au), and platinum (Pt).

According to one embodiment, the first surface modifier may be an organic molecule having one or more selected from the group consisting of a carboxyl group, an amine group, an imine group, a hydroxyl group, and a carbonyl group or a polymer having one or more selected from the group consisting of a carboxyl group, an amine group, an imine group, a hydroxyl group, and a carbonyl group.

According to one embodiment, the second surface modifier may be an organic molecule having one or more selected from the group consisting of a carboxyl group, an amine group, an imine group, a hydroxyl group, and a carbonyl group or a polymer having one or more selected from the group consisting of a carboxyl group, an amine group, an imine group, a hydroxyl group, and a carbonyl group.

According to one embodiment, in the immersing, the surface-modified metal substrate may be immersed in the solution containing the surface-modified metal nanoparticles for 10 minutes to 12 hours.

According to one embodiment, light firing may be performed under a general atmosphere.

In accordance with another aspect of the present disclosure, provided is a surface-functionalized metal foil including a metal substrate; and a surface functional layer formed on the metal substrate, wherein the surface functional layer is formed by performing light firing of metal nanoparticles adsorbed as a single layer on the metal substrate.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE DISCLOSURE

Figure 1A:
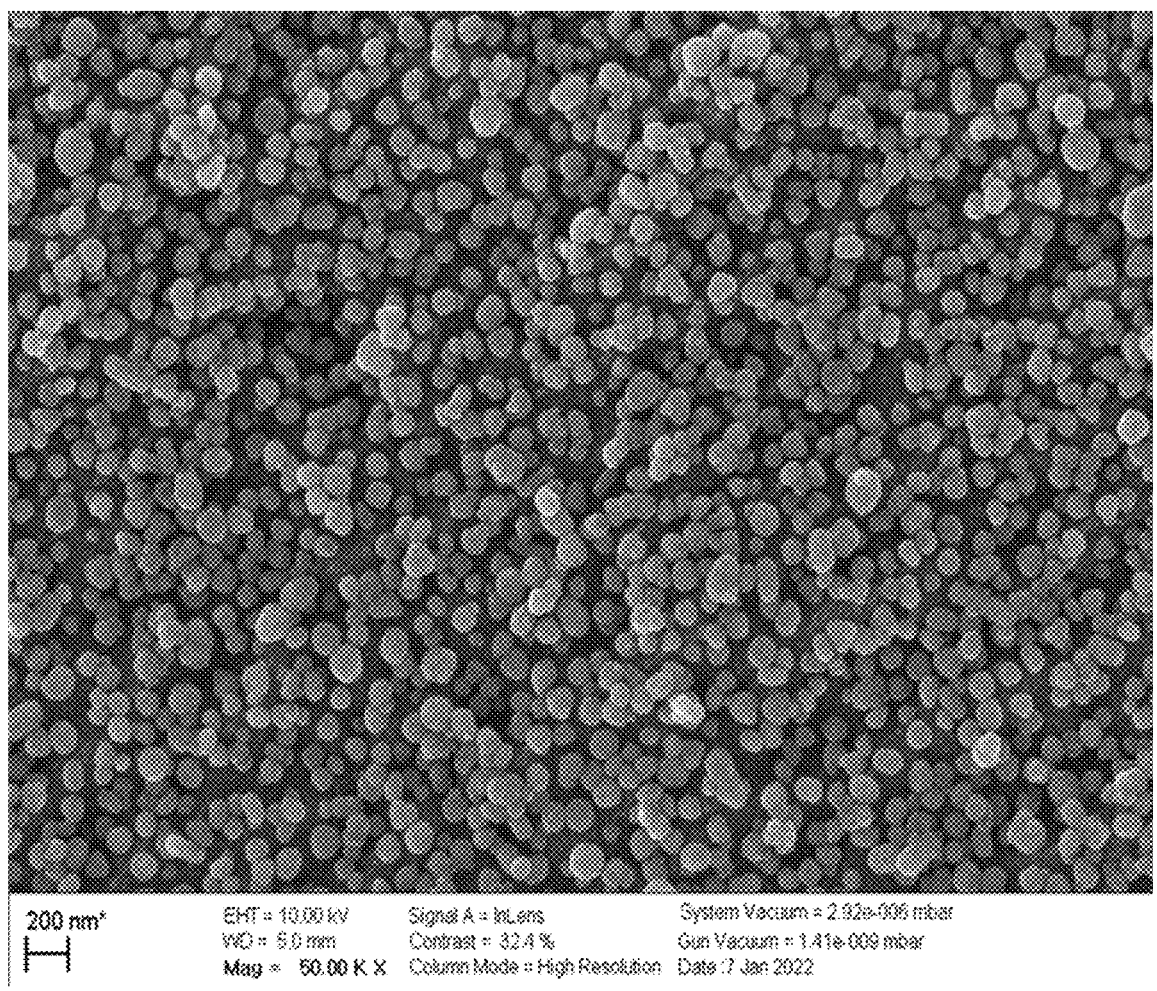
FIGS. 1A and 1B are scanning electron microscope (SEM) images before and after laser irradiation in Example 1.

The present disclosure will now be described more fully with reference to the accompanying drawings and contents disclosed in the drawings. However, the present disclosure should not be construed as limited to the exemplary embodiments described herein.

The terms used in the present specification are used to explain a specific exemplary embodiment and not to limit the present inventive concept. Thus, the expression of singularity in the present specification includes the expression of plurality unless clearly specified otherwise in context. It will be further understood that the terms "comprise" and/or "comprising", when used in this specification, specify the presence of stated components, steps, operations, and/or elements, but do not preclude the presence or addition of one or more other components, steps, operations, and/or elements thereof.

It should not be understood that arbitrary aspects or designs disclosed in "embodiments", "examples", "aspects", etc. used in the specification are more satisfactory or advantageous than other aspects or designs.

In addition, the expression "or" means "inclusive or" rather than "exclusive or". That is, unless mentioned otherwise or clearly inferred from context, the expression "x uses a or b" means any one of natural inclusive permutations.

In addition, as used in the description of the disclosure and the appended claims, the singular form "a" or "an" is intended to include the plural forms as well, unless context clearly indicates otherwise.

In addition, when an element such as a layer, a film, a region, and a constituent is referred to as being "on" another element, the element can be directly on another element or an intervening element can be present.

Hereinafter, embodiments of the present disclosure will be described in detail with reference to the accompanying drawings.

A method of preparing a surface-functionalized metal foil according to one embodiment of the present disclosure includes a step of preparing a surface-modified metal substrate using a first surface modifier, a step of preparing surface-modified metal nanoparticles using a second surface modifier, a step of immersing the surface-modified metal substrate in a solution containing the surface-modified metal nanoparticles to adsorb the metal nanoparticles as a single layer on the metal substrate, and a step of drying the metal substrate on which the metal nanoparticles are adsorbed and then performing light firing of the metal nanoparticles to form a surface functional layer.

The present disclosure provides a technique capable of imparting functionality to a metal foil by forming a functional layer with different metals using metal nanoparticles.

In the present disclosure, foil means a surface-functionalized substrate prepared by adsorbing metal nanoparticles on a substrate and applying energy to the metal nanoparticles.

In the present disclosure, "functionalization" means to make something electrically conductive or electrochemically stable, and a "functional layer" means a layer having electrical conductivity or electrochemical stability. In addition, in the present disclosure, the functional layer is formed through alloying of different metals.

According to an embodiment, the metal nanoparticles may be adsorbed by physical bonding on the metal substrate. As described above, it is an important feature that the metal nanoparticles are adsorbed as a single layer on the metal substrate, and the adsorption was performed using a surface modifier.

The metal nanoparticles adsorbed as a single layer on the metal substrate have a very high absorption rate for photons of a specific wavelength. The metal nanoparticles absorb light energy during a light irradiation process and convert the light energy into thermal energy. The converted thermal energy induces an alloying reaction on the surface of the metal substrate, enabling preparation of a surface-functionalized metal foil. By inducing fusion and alloying reaction of different metal materials on the surface of the metal substrate, new functionality may be imparted to the surface of the metal foil.

Some of light energy absorbed by the metal nanoparticles is converted into thermal energy. Through a fusion reaction in which the metal nanoparticles are partially melted, the metal nanoparticles spread on the metal substrate and an inter-diffusion reaction with the metal substrate occurs. The elements of the metal nanoparticles migrate to the metal substrate, and the elements of the metal substrate migrate to the metal nanoparticles. That is, an alloy containing some elements of the metal substrate is formed in the metal nanoparticles, and an alloy containing some elements of the metal nanoparticles is formed in the metal substrate. As the intensity and time of the light energy are increased, the elements of the metal nanoparticles diffuse into the metal substrate as a whole, and a metal alloy containing some elements of the metal nanoparticles is formed. Through this process, a functional foil is prepared.

During a firing process, when heat is directly applied to transition metal nanoparticles, the transition metal nanoparticles are oxidized during the heat treatment, suppressing diffusion of metal elements. Accordingly, to solve this problem, an inert atmosphere should be created during the heat treatment. On the other hand, in the case of light firing, even a very short light irradiation of about 1 msec exhibits an effect similar to that of heat treatment. Accordingly, the process may be performed without oxidation of the transition metal even under a general atmospheric condition.

According to an embodiment, to maximize the contact area between the metal nanoparticles and the metal substrate, the metal nanoparticles may be formed as a single layer during adsorption. The metal nanoparticles may be adsorbed at a rate of 10% to 95% based on the total area of the metal substrate. That is, the adsorption ratio is the percentage of the area where the metal nanoparticles are in contact with the metal substrate relative to the total area of the metal substrate.

When the adsorption layer of metal nanoparticles is formed in multiple layers, heat transfer efficiency may be reduced because generated thermal energy may not be directly transferred to the surface of the metal substrate.

According to an embodiment, the metal nanoparticles may have a diameter of 10 nm to 200 nm, preferably 20 nm to 150 nm.

When the metal nanoparticles have such a diameter, the metal nanoparticles may absorb photons when irradiated with light. When the diameter of the metal nanoparticles exceeds the range, the amount of photons absorbed by the metal nanoparticles decreases, and thus the surface of the metal substrate may not be sufficiently functionalized. When the diameter of the metal nanoparticles is less than the range, as the specific surface area of the metal nanoparticles increases, an oxide film may be formed on the surface of the metal nanoparticles, which may limit fusion and alloying reactions.

The metal substrate may include any one selected from the group consisting of zinc (Zn), copper (Cu), nickel (Ni), aluminum (Al), stainless steel, titanium (Ti), molybdenum (Mo), gold (Au), and platinum (Pt).

According to an embodiment, the metal nanoparticles may include any one selected from gold, silver, copper, nickel, tin, and an alloy composition thereof. The metal nanoparticles may be any one of the above metals or an alloy of two or more of the above metals.

The metal substrate and the metal nanoparticles are prepared using different materials.

Depending on the composition of the alloy, different physical properties may be expressed. In particular, in the case of a metal foil in which a functional layer in the form of an alloy is formed as a thin film on the surface of the metal substrate, there is an advantage in that the surface properties may be controlled due to the surface functional layer while maintaining the overall properties of the metal substrate. By inducing alloying on the surface layer of the metal substrate, a foil capable of securing properties that have not been previously expressed may be obtained.

Through Grazing Incidence X-ray Diffraction (GIXRD) analysis of the surface of the surface-functionalized metal foil, it can be confirmed whether the alloying has been performed normally. By comparing the intensities of $Cu_4Zn$ peaks, which are the alloy peaks of copper and zinc, it can be confirmed whether a zinc-copper alloy is formed.

In the alloying process through light firing, first, a substrate on which metal nanoparticles are adsorbed is irradiated with light, the metal nanoparticles absorb light energy and convert the light energy into thermal energy, and due to the converted thermal energy, alloying occurs between different metals in metal nanoparticles and the metal substrate.

Some of the light energy absorbed by the metal nanoparticles is converted into thermal energy. When thermal energy is applied, the metal nanoparticles partially melt and spread on the metal substrate. As a result, elements of the metal nanoparticles and elements of the metal substrate are diffused and mixed with each other. Through this phenomenon, an alloy of the two metals is formed on the surface of the metal substrate on which the metal nanoparticles are adsorbed. Through formation of the alloy containing the metal nanoparticles, the metal substrate may be prepared into a metal foil endowed with new functionality from the metal nanoparticles. As the power of a light source is increased or irradiation time is increased, the amount of alloy formed between the metal nanoparticles and the metal substrate increases.

A surface-functionalized metal foil according to an embodiment of the present disclosure is prepared by a method including a step of preparing a surface-modified metal substrate using a first surface modifier, a step of preparing surface-modified metal nanoparticles using a second surface modifier, a step of immersing the surface-modified metal substrate in a solution containing the surface-modified metal nanoparticles to adsorb the metal nanoparticles on the metal substrate, and a step of irradiating the metal nanoparticles with light to form a surface functional layer. In the immersing step, the metal nanoparticles are adsorbed as a single layer.

In the present disclosure, the first surface modifier and the second surface modifier refer to organic molecules or polymers containing functional groups capable of bonding with metals. That is, the metal substrate and the first surface modifier are combined, the metal nanoparticles and the second surface modifier are combined, and then the surface-modified metal substrate and the surface-modified metal nanoparticles are physically combined. At this time, monolayer adsorption of the metal nanoparticles occurs through a surface reaction.

Specifically, the metal substrate is immersed in a mixture of the first surface modifier and a solvent to modify the surface of the metal substrate, and the second surface modifier is used to synthesize the metal nanoparticles. By adding the metal nanoparticles surface-modified with the second surface modifier to a solution containing the metal substrate surface-modified with the first surface modifier and mixing the the metal nanoparticles and the solution, the first surface modifier and the second surface modifier are combined and the metal nanoparticles are adsorbed on the metal substrate. Surface modification may be a form in which a functional group of an organic molecule is adsorbed through a physical bond with a functional group of a material to be surface-modified, or a form in which a functional group of a polymer is capped through a physical bond with a functional group to be surface-modified.

According to an embodiment, the first surface modifier may be an organic molecule having one or more functional groups selected from the group consisting of a carboxyl group, an amine group, an imine group, a hydroxyl group, and a carbonyl group or a polymer having one or more functional groups selected from the group consisting of a carboxyl group, an amine group, an imine group, a hydroxyl group, and a carbonyl group.

More specifically, the first surface modifier may be any one organic molecule selected from the group consisting of citric acid (CA), aminobenzoic acid, aminocyclohexanecarboxylic acid, aminobutyric acid, ethylene-diamine-tetraacetic acid, ethylenediamine, diethylenetriamine, and acetylacetone, without being limited thereto.

In addition, the first surface modifier may be any one polymer selected from the group consisting of polyethyleneimine, polyallyamine, polyacrylic acid, polypropylene glycol, polyethylene glycol, ethylacetoacetate, and polyvinylpyrrolidone (PVP), without being limited thereto.

According to an embodiment, the second surface modifier may be an organic molecule having one or more functional groups selected from the group consisting of a carboxyl group, an amine group, an imine group, a hydroxyl group, and a carbonyl group or a polymer having one or more functional groups selected from the group consisting of a carboxyl group, an amine group, an imine group, a hydroxyl group, and a carbonyl group.

More specifically, the second surface modifier may be any one organic molecule selected from the group consisting of citric acid (CA), aminobenzoic acid, aminocyclohexanecarboxylic acid, aminobutyric acid, ethylene-diamine-tetraacetic acid, ethylenediamine, diethylenetriamine, and acetylacetone, without being limited thereto.

In addition, the second surface modifier may be any one polymer selected from the group consisting of polyethyleneimine, polyallyamine, polyacrylic acid, polypropylene glycol, polyethylene glycol, ethylacetoacetate, and polyvinylpyrrolidone (PVP), without being limited thereto.

The materials available for the first surface modifier and the second surface modifier are the same.

For the first surface modifier and the second surface modifier, the same material may be selected and used, or different materials may be selected and used.

In the step of adsorbing the metal nanoparticles as a single layer on the metal substrate, the surface-modified metal substrate may be immersed in the solution containing the surface-modified metal nanoparticles for 10 minutes to 12 hours.

When the immersion time exceeds the range, the metal nanoparticles are continuously adsorbed on the metal substrate, and as a result, the metal nanoparticles may be formed in multiple layers. In the case of multi-layered metal nanoparticles, during light firing, thermal energy converted from light energy is not used to alloy the metal nanoparticles and the metal substrate, but the thermal energy is consumed to form a sintered structure connecting the multi-layered metal nanoparticles. Accordingly, an alloy of the metal substrate and the metal nanoparticles may not be formed. When the immersion time is less than the range, only a portion of the metal nanoparticles may be adsorbed on the metal substrate because the time is not sufficient for the metal nanoparticles to be adsorbed on the metal substrate.

When the metal substrate is immersed in the solution containing the metal nanoparticles without treatment with the second surface modifier, no surface reaction occurs between the metal substrate and the metal nanoparticles. Thus, adsorption may not occur even when the immersion time is increased.

When the metal nanoparticle layer adsorbed on the surface of the metal substrate is irradiated with light, a firing reaction occurs on the surface of the metal substrate. The metal nanoparticles absorb light energy, and the absorbed light energy is converted into thermal energy, and a heat treatment effect appears. At this time, to generate a surface reaction between the metal nanoparticles and the metal substrate, the widest interface must be formed. Accordingly, when the metal nanoparticles are adsorbed on the surface of the metal substrate, the metal nanoparticles should be adsorbed as a single layer. When the metal nanoparticles are agglomerated, thermal energy does not reach the metal substrate sufficiently during the light firing process. Thus, in this case, the metal nanoparticles may not serve as a functional layer, which is undesirable.

According to an embodiment, the light irradiation process may be performed under a general atmosphere rather than an inert atmosphere. The general atmosphere means that oxygen content is 21 v/v % and pressure is 1 atm.

Light treatment on the metal nanoparticles converts light energy into thermal energy, resulting in the same effect as heat treatment. However, to obtain the same effect, light irradiation may be performed only for a short time, such as the range, unlike heat treatment for 30 minutes or more. There is a problem that surface functionalization does not sufficiently occur when heat treatment is performed for about 1 msec instead of light irradiation under a general atmospheric condition. Accordingly, during heat treatment, since thermal energy is applied for a relatively long time to oxidize the metal nanoparticles, a thermal firing process is performed under an inert gas condition to prevent loss of desired properties of a metal material, such as electrical conductivity. However, during light firing, since light energy is applied to the metal nanoparticles for a short time of about 1 msec, the metal nanoparticles are not oxidized even when the process is performed under a general atmospheric condition.

According to an embodiment, white light may be used as a light source in the light irradiation step. When white light is used as the light source, a surface-functionalized metal foil may be obtained by irradiating a metal substrate with white light at a light energy density of 0.1 J/cm$^2$ to 20 J/cm$^2$ for a short time of 0.5 msec to 30 msec.

According to an embodiment, in the light irradiation step, visible light or infrared wavelength laser may be used as a light source.

When using laser as a light source, a surface-functionalized metal foil may be prepared by irradiating a metal substrate with laser at a scan rate of 50 mm/sec to 2,000 mm/sec under a power condition of 0.5 W to 15 W. By radiating laser at a scan rate of 2,000 mm/sec, light firing of a sample having a length of 100 mm may be performed for a short time of 50 msec. By radiating laser at a scan rate of 100 mm/sec, light firing of a sample having a length of 100 mm may be performed for 1 sec. The width of the sample is determined by the area of a laser beam. When light irradiation is performed for a short time of 0.5 msec or less, the light firing reaction is not completed because sufficient light energy is not injected.

The surface-functionalized metal foil according to one embodiment of the present disclosure includes the metal substrate and the surface functional layer formed on the metal substrate, and the surface functional layer is formed through light firing of the metal nanoparticles adsorbed as a single layer on the metal substrate.

Hereinafter, the present disclosure will be described in more detail through examples. These examples are intended to explain the present disclosure in more detail, and the scope of the present disclosure is not limited by these examples.

[PREPARATION EXAMPLE 1] SYNTHESIS OF COPPER NANOPARTICLES 8 g of polyvinylpyrrolidone (PVP) having a molecular weight of 58,000 was added to 280 mL of diethyleneglycol, followed by stirring at 90° C. for 30 minutes to dissolve PVP. The obtained solution was cooled to room temperature, 0.85 g of sodium phosphinate monohydrate (NaH$_2$PO$_2$·H$_2$O) was added thereto, and the solution was heated to 130° C. while stirring. Then, after adding 7 g of CuSO$_4$ to the solution, the solution was stirred and reacted at 130° C. for 1 hour, and then cooled to room temperature. Then, centrifugation was performed at 7,000 rpm for 15 minutes to obtain a precipitate.

The precipitate was copper nanoparticles having a particle size of 90 nm.

[PREPARATION EXAMPLE 2] SYNTHESIS OF NICKEL NANOPARTICLES 8 g of polyvinylpyrrolidone (PVP) having a molecular weight of 58,000 was added to 280 mL of ethyleneglycol, followed by stirring at 90° C. for 30 minutes. The obtained solution was cooled to room temperature, 4.65 g of nickel chloride hexahydrate and 1.6 g of sodium borohydride (NaBH$_4$) were added thereto, and the solution was heated to 150° C. while stirring. After reacting for 1 hour, the solution was cooled to room temperature. Then, centrifugation was performed at 7,000 rpm for 15 minutes to obtain a precipitate.

The precipitate was nickel nanoparticles having a particle size of 20 nm.

[PREPARATION EXAMPLE 3] SYNTHESIS OF SILVER NANOPARTICLES 2.13 g of polyvinylpyrrolidone (PVP) having a molecular weight of 10,000 as a reducing agent was added to 150 mL of ethylene glycol, followed by stirring at 80° C. to dissolve PVP. The obtained solution was cooled to room temperature, and 6.43 g of silver (Ag) nitrate was added thereto. Then, the solution was reacted at 120° C. for 1 hour, and then cooled to room temperature. Then, centrifugation was performed at 7,000 rpm for 15 minutes to obtain a precipitate.

The precipitate was silver nanoparticles having a particle size of 60 nm.

EXAMPLE 1

A zinc substrate was immersed in 30 g of a 2.0 M aqueous hydrochloric acid (HCl) solution and etched for 3 minutes to remove an oxide film present on the surface of the zinc substrate and obtain a pure zinc substrate. After cleaning the zinc substrate with UV light for 5 minutes using a UV ozone cleaner, the zinc substrate was immersed in a solution prepared by dissolving 0.9 g of citric acid in 21.1 g of ethanol. After 30 minutes, the zinc substrate was taken out and immersed for 3 hours in a solution prepared by dispersing 0.2 g of copper nanoparticles prepared in Preparation Example 1 in 18.8 g of ethanol. After washing with ethanol and drying at room temperature, a zinc substrate on which the copper nanoparticles were adsorbed as a single layer was obtained. Then, the zinc substrate was irradiated with laser at an energy density of 15.4 J/cm$^2$ under a general atmosphere to obtain a zinc foil having a zinc-copper surface functional layer.

By radiating laser at a scan rate of 200 mm/sec, light firing of a sample having a length of 100 mm was performed for a short time of 500 msec.

EXAMPLE 2

A zinc substrate was immersed in 30 g of a 2.0 M aqueous hydrochloric acid (HCl) solution and etched for 3 minutes. After cleaning the zinc substrate with UV light for 5 minutes using a UV ozone cleaner, the zinc substrate was immersed in a solution prepared by dissolving 0.9 g of citric acid in 21.1 g of ethanol. After 30 minutes, the substrate was taken out and immersed for 30 minutes in a solution prepared by dispersing 0.2 g of nickel nanoparticles prepared in Preparation Example 2 in 18.8 g of ethanol. After washing with ethanol and drying at room temperature, a zinc substrate on which the nickel nanoparticles were adsorbed as a single layer was obtained. Then, the zinc substrate was irradiated with laser at an energy density of 15.4 J/cm$^2$ under a general atmosphere to obtain a zinc foil having a zinc-nickel surface functional layer.

By radiating laser at a scan rate of 200 mm/sec, light firing of a sample having a length of 100 mm was performed for a short time of 500 msec.

EXAMPLE 3

After cleaning a copper substrate with UV light for 5 minutes using a UV ozone cleaner, the copper substrate was immersed in a solution prepared by dissolving 0.9 g of citric acid in 21.1 g of ethanol. After 30 minutes, the substrate was taken out and immersed for 3 hours in a solution prepared by dispersing 0.2 g of silver nanoparticles prepared in Preparation Example 3 in 18.8 g of ethanol. After washing with ethanol and drying at room temperature, a copper substrate on which the silver nanoparticles were adsorbed as a single layer was obtained. Then, the copper substrate was irradiated with laser at an energy density of 15.4 J/cm$^2$ under a general atmosphere to obtain a copper foil having a copper-silver surface functional layer.

By radiating laser at a scan rate of 200 mm/sec, light firing of a sample having a length of 100 mm was performed for a short time of 500 msec.

Comparative Example 1

A zinc substrate was immersed in 30 g of a 2.0 M aqueous hydrochloric acid (HCl) solution and etched for 3 minutes to remove an oxide film present on the surface of the zinc substrate and obtain a pure zinc substrate. After cleaning the zinc substrate with UV light for 5 minutes using a UV ozone cleaner, the zinc substrate was immersed in a solution prepared by dissolving 0.9 g of citric acid in 21.1 g of ethanol. After 30 minutes, the substrate was taken out and immersed for 3 hours in a solution prepared by dispersing 0.2 g of copper nanoparticles prepared in Preparation Example 1 in 18.8 g of ethanol. After washing with ethanol and drying at room temperature, a zinc substrate on which the copper nanoparticles were adsorbed as a single layer was obtained. Then, the zinc substrate was heat-treated at 250° C. for 1 hour under a general atmosphere.

In the case of Comparative Example 1, the copper nanoparticles were oxidized due to thermal energy applied for a long time, which prevented fusion and alloying reaction with the zinc substrate. As a result, no functional layer was formed.

Comparative Example 2

Without adsorption of metal nanoparticles on a zinc substrate, the zinc substrate was irradiated with laser at an energy density of 15.4 J/cm$^2$ under a general atmosphere.

By radiating laser at a scan rate of 200 mm/sec, light firing of a sample having a length of 100 mm was performed for a short time of 500 msec.

In the case of Comparative Example 2, metal nanoparticles that absorb light energy were not present on the substrate, and there was no object to be alloyed. Thus, there was no change even when light treatment was applied to the metal substrate.

Comparative Example 3

A zinc substrate was immersed in 30 g of a 2.0 M aqueous hydrochloric acid (HCl) solution and etched for 3 minutes to remove an oxide film present on the surface of the zinc substrate and obtain a pure zinc substrate. After cleaning the zinc substrate with UV light for 5 minutes using a UV ozone cleaner, the zinc substrate was immersed in a solution prepared by dissolving 0.9 g of citric acid in 21.1 g of ethanol. After 30 minutes, the substrate was taken out and immersed for one day in a solution prepared by dispersing 0.2 g of copper nanoparticles prepared in Preparation Example 1 in 18.8 g of ethanol. After washing with ethanol and drying at room temperature, a zinc substrate on which the copper nanoparticles were adsorbed as multiple layers was obtained. Then, the zinc substrate was irradiated with laser at an energy density of 15.4 J/cm$^2$ under a general atmosphere.

By radiating laser at a scan rate of 200 mm/sec, light firing of a sample having a length of 100 mm was performed for a short time of 500 msec.

In the case of Comparative Example 3, since light energy was absorbed by the multi-layered copper nanoparticles, most of thermal energy was consumed to form a sintered structure in which the copper nanoparticles are connected in multiple layers, so an alloy of the zinc substrate and the copper nanoparticles was not formed.

Preparation Examples and Examples are summarized and presented in a table as follows.

TABLE 1

| | Types of nanoparticles | Types of metal substrates | Adsorption form | Firing method | Classification |
|---|---|---|---|---|---|
| Preparation Example 1 | Copper | — | — | — | Nanoparticles |

TABLE 1-continued

| | Types of nano-particles | Types of metal substrates | Adsorption form | Firing method | Classi-fication |
|---|---|---|---|---|---|
| Preparation Example 2 | Nickel | — | — | — | Nano-particles |
| Preparation Example 3 | Silver | — | — | — | Nano-particles |
| Example 1 | Copper | Zinc | Single-layer form | Light irradiation | Foil |
| Example 2 | Nickel | Zinc | Single-layer form | Light irradiation | Foil |
| Example 3 | Silver | Copper | Single-layer form | Light irradiation | Foil |
| Comparative Example 1 | Copper | Zinc | Single-layer form | Heat treatment | Foil |
| Comparative Example 2 | — | Zinc | — | Light irradiation | Foil |
| Comparative Example 3 | Copper | Zinc | Multilayer form | Light irradiation | Foil |

Figure 1B:
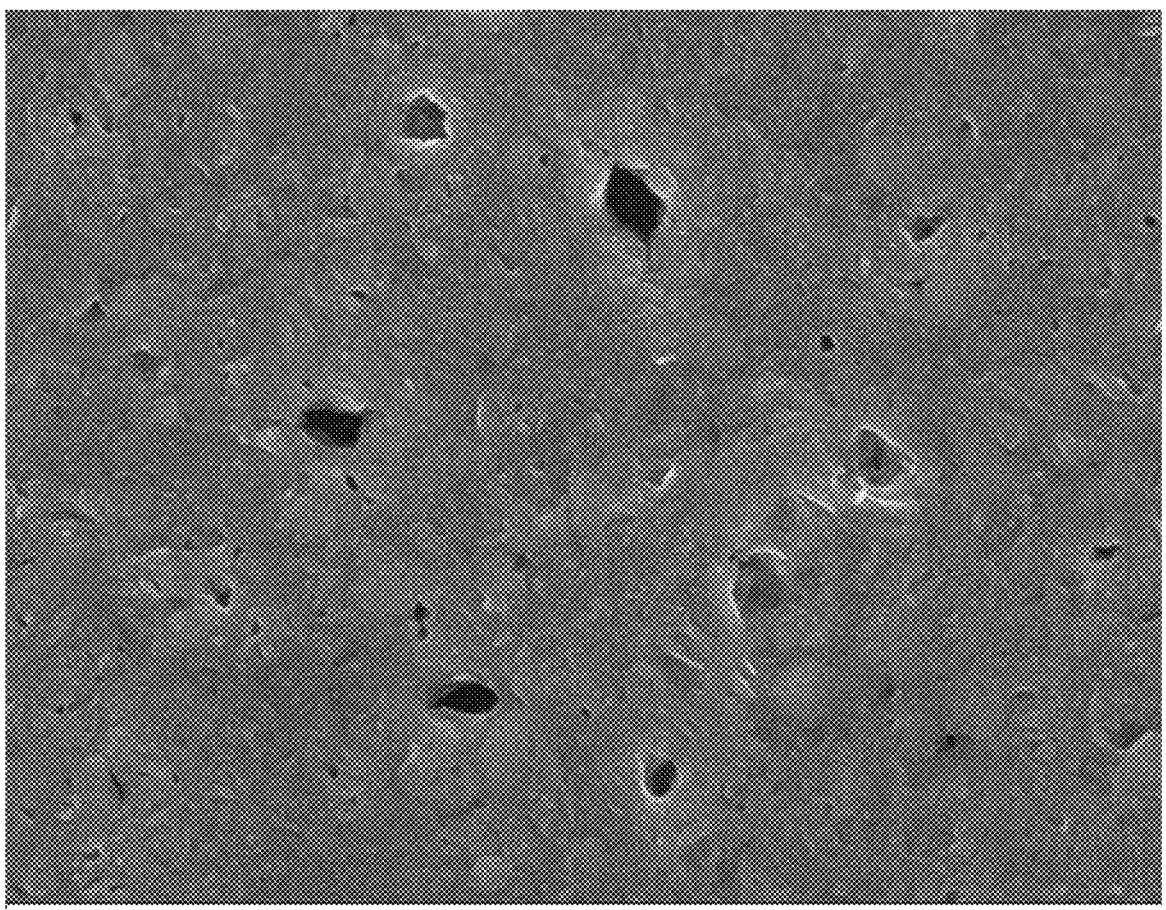

FIGS. 1A and 1B are scanning electron microscope (SEM) images before and after laser irradiation in Example 1. Referring to FIG. 1A, it can be seen that copper nanoparticles are adsorbed as a single layer on the surface of a zinc substrate. Since citric acid, which is a surface modifier, mediates bonding between the zinc substrate and the copper nanoparticles, the copper nanoparticles may be adsorbed on the zinc substrate as a single layer. Referring to FIG. 1B, upon laser irradiation, fusion and an alloying reaction occur between a copper nanoparticle layer that absorbs light energy and the surface layer of the zinc substrate, and as a result, the copper nanoparticles diffuse into the inside of the zinc substrate. As such, the copper nanoparticles and a part of the zinc substrate included in the surface functional layer of the surface-functionalized zinc foil are integrated and cannot be distinguished by a SEM image.

Figure 1C:
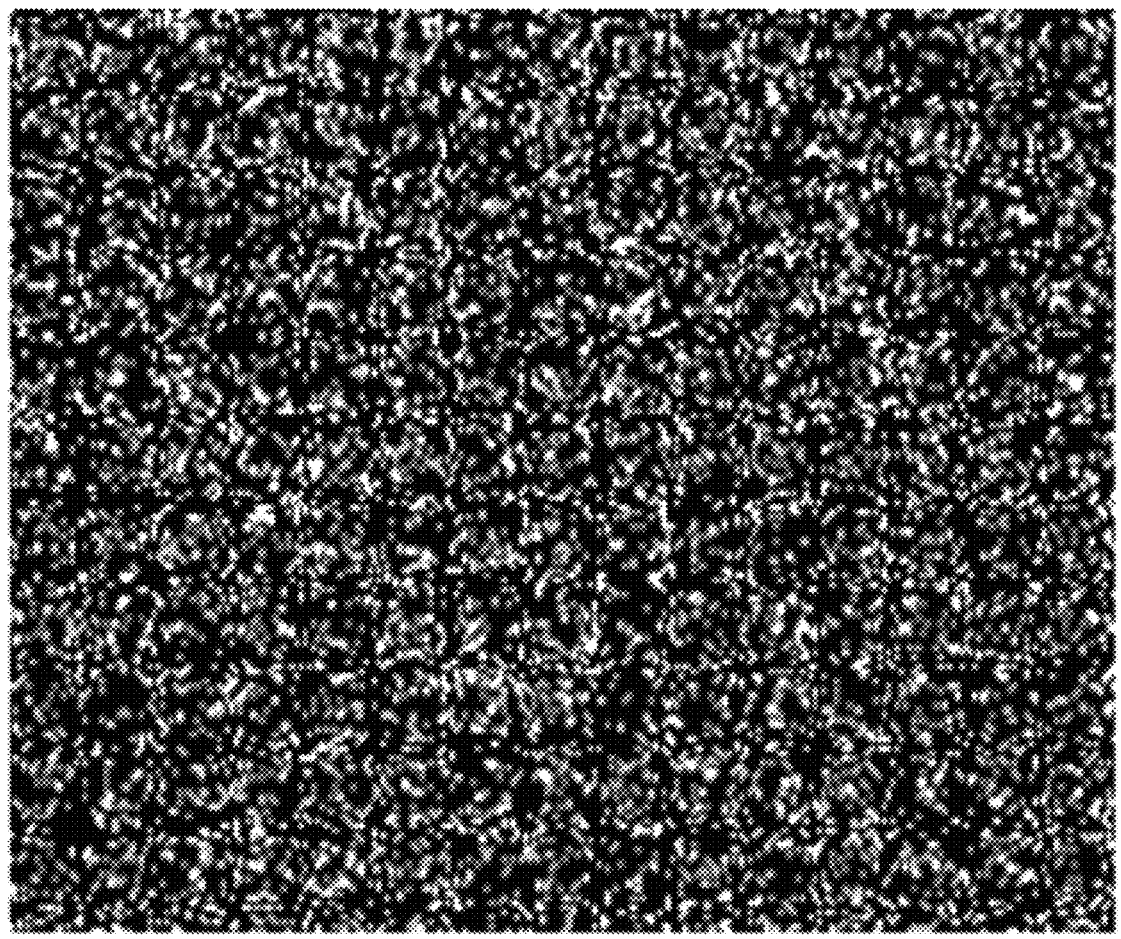
FIGS. 1C and 1D are energy-dispersive X-ray spectroscope (EDS) images after laser irradiation in Example 1.
Figure 1D:
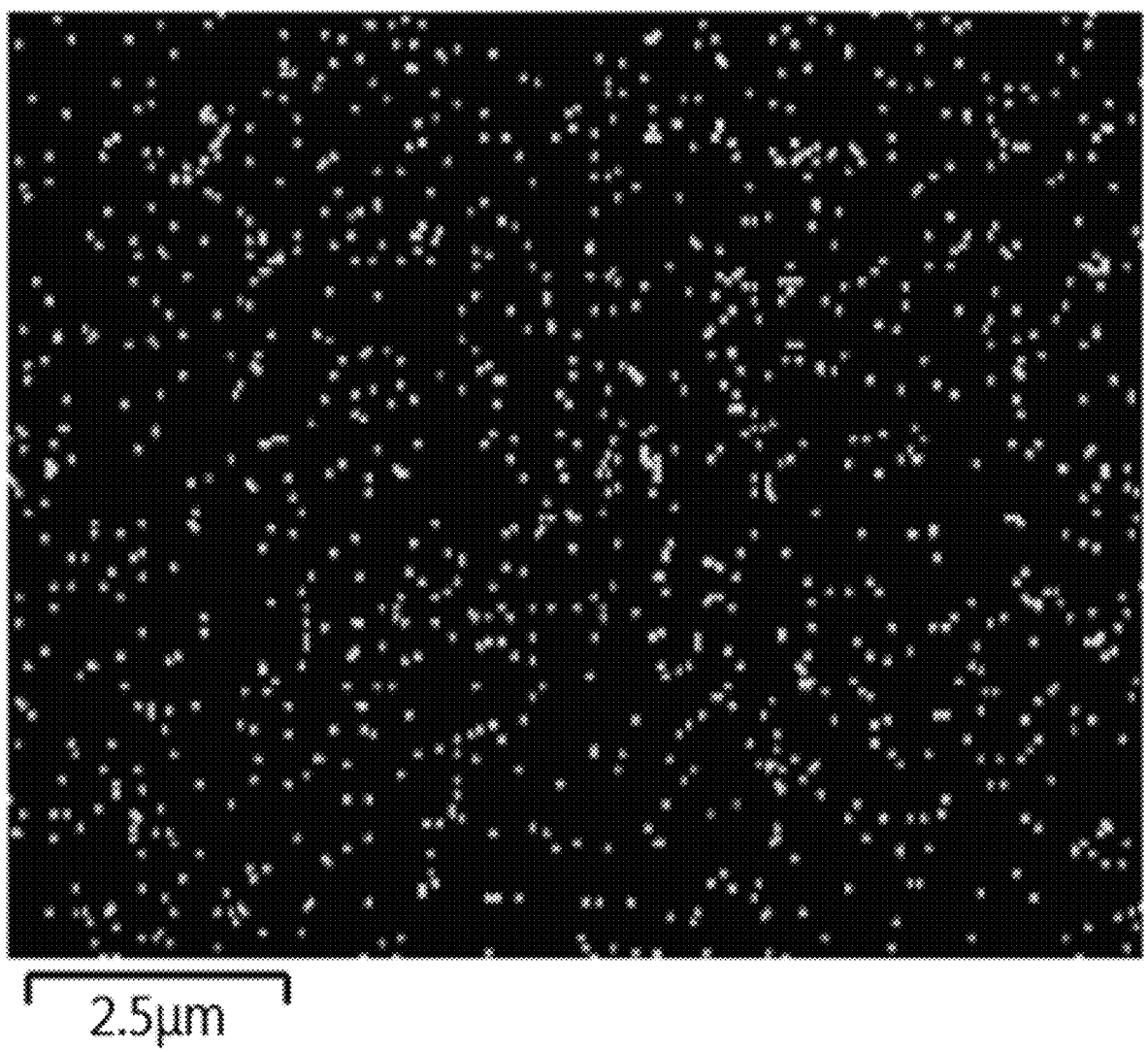

FIGS. 1C and 1D are energy-dispersive X-ray spectroscope (EDS) images after irradiating the product of Example 1 with laser.

FIG. 1C is an image of detected zinc (Zn) elements, and FIG. 1D is an image of detected copper (Cu) elements. Referring to FIGS. 1C and 1D, it can be confirmed that copper elements were detected in the zinc foil after being irradiated with laser. Based on these results, in the SEM image of FIG. 1C, the copper nanoparticles cannot be distinguished on the surface of the substrate, but it can be seen that the copper nanoparticles are diffused into the zinc foil.

Figure 1E:
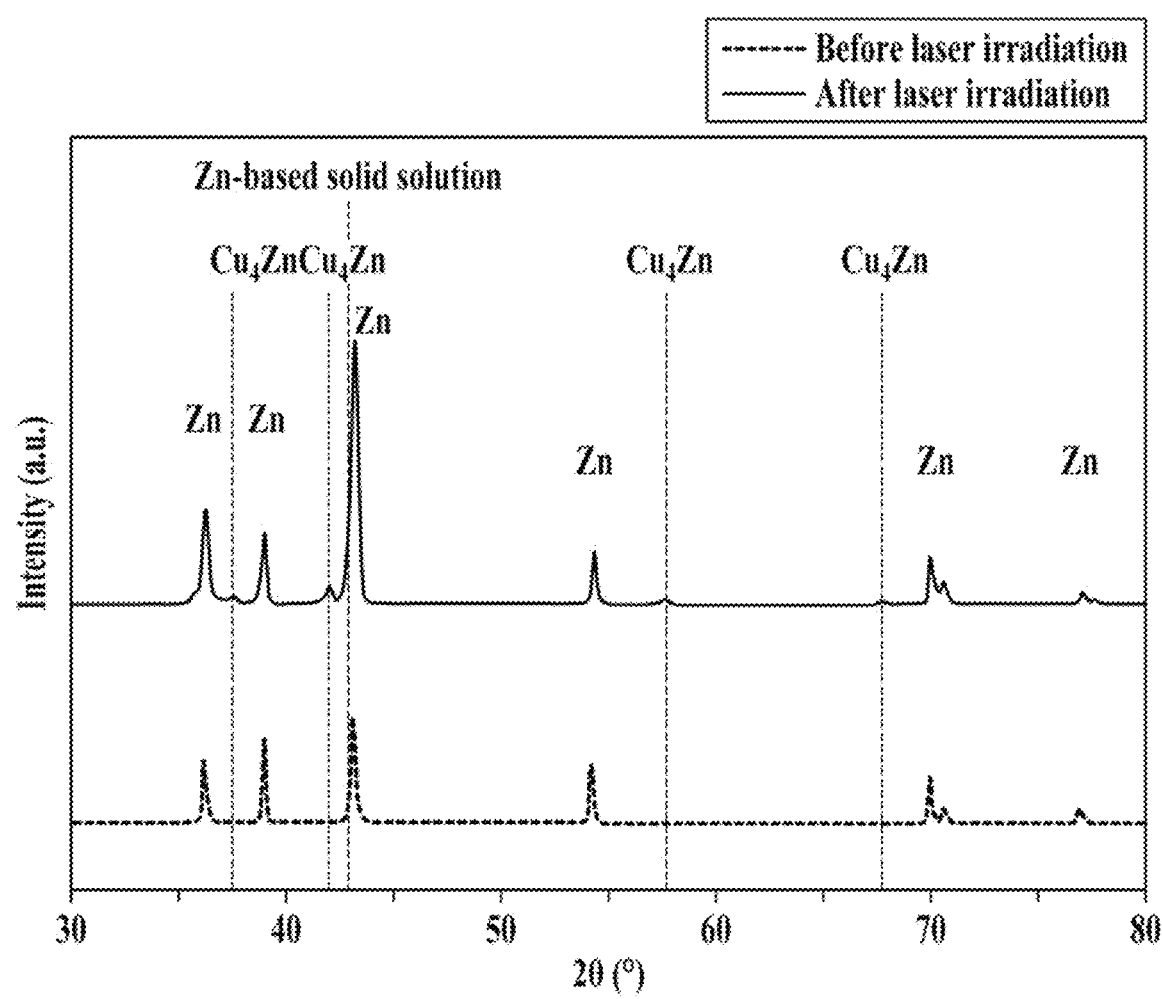
FIG. 1E is a grazing incidence X-ray diffraction (GIXRD) graph of Example 1.

FIG. 1E is a grazing incidence X-ray diffraction (GIXRD) graph of Example 1. Referring to FIG. 1E, the black line below corresponds to the product of Example 1 before irradiation with laser, and the red line above corresponds to the product of Example 1 after irradiation with laser.

Referring to FIG. 1E, compared to before laser irradiation, after laser irradiation, the solid zinc peak located at 43.1° (indicated by Zn-based solid solution) broadens toward a lower angle (2θ). This result indicates formation of a solid solution containing copper in zinc. In addition, the intensities of $Cu_4Zn$ peaks located at 37.5°, 42.0°, 57.6°, and 67.8° are increased. Based on this result, it can be confirmed that a zinc-copper alloy exists on the surface of the surface-functionalized zinc foil.

Figure 2A:
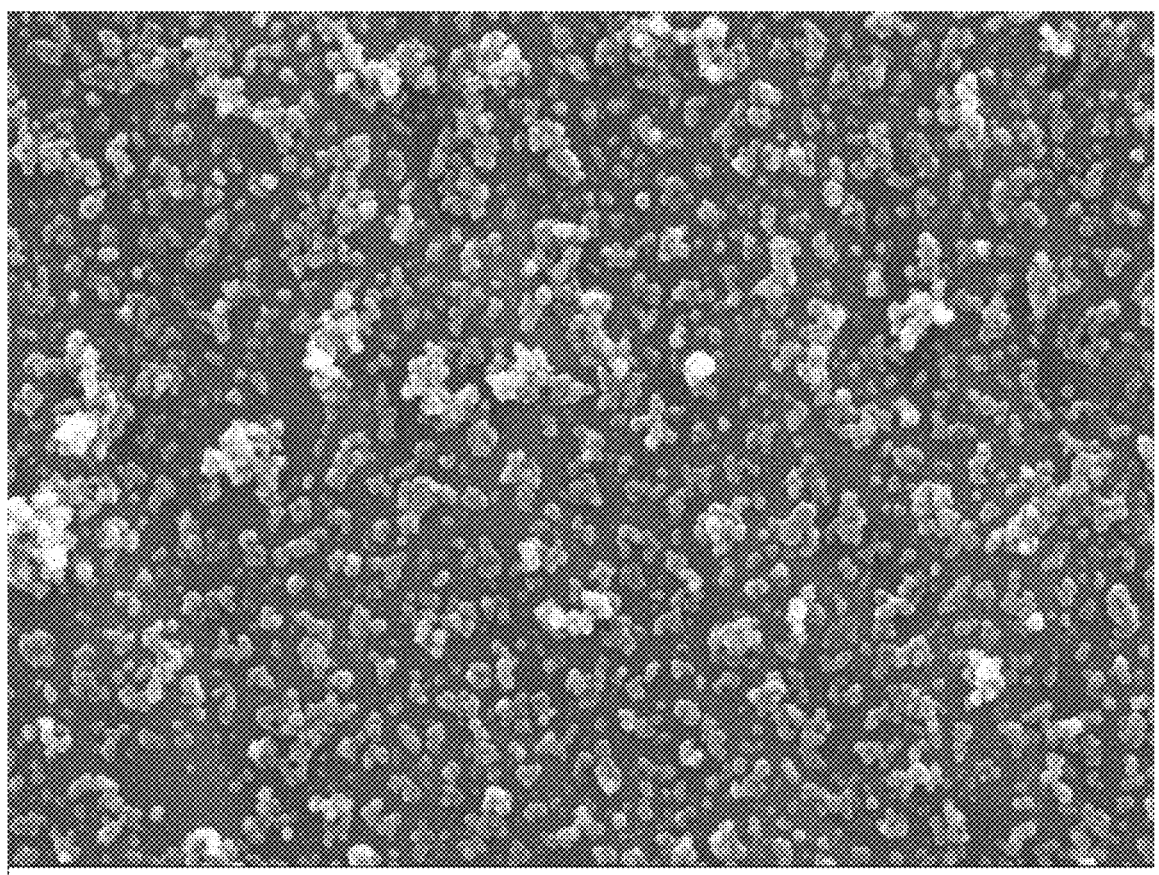
FIGS. 2A and 2B are scanning electron microscope (SEM) images before and after laser irradiation in Example 2.
Figure 2B:
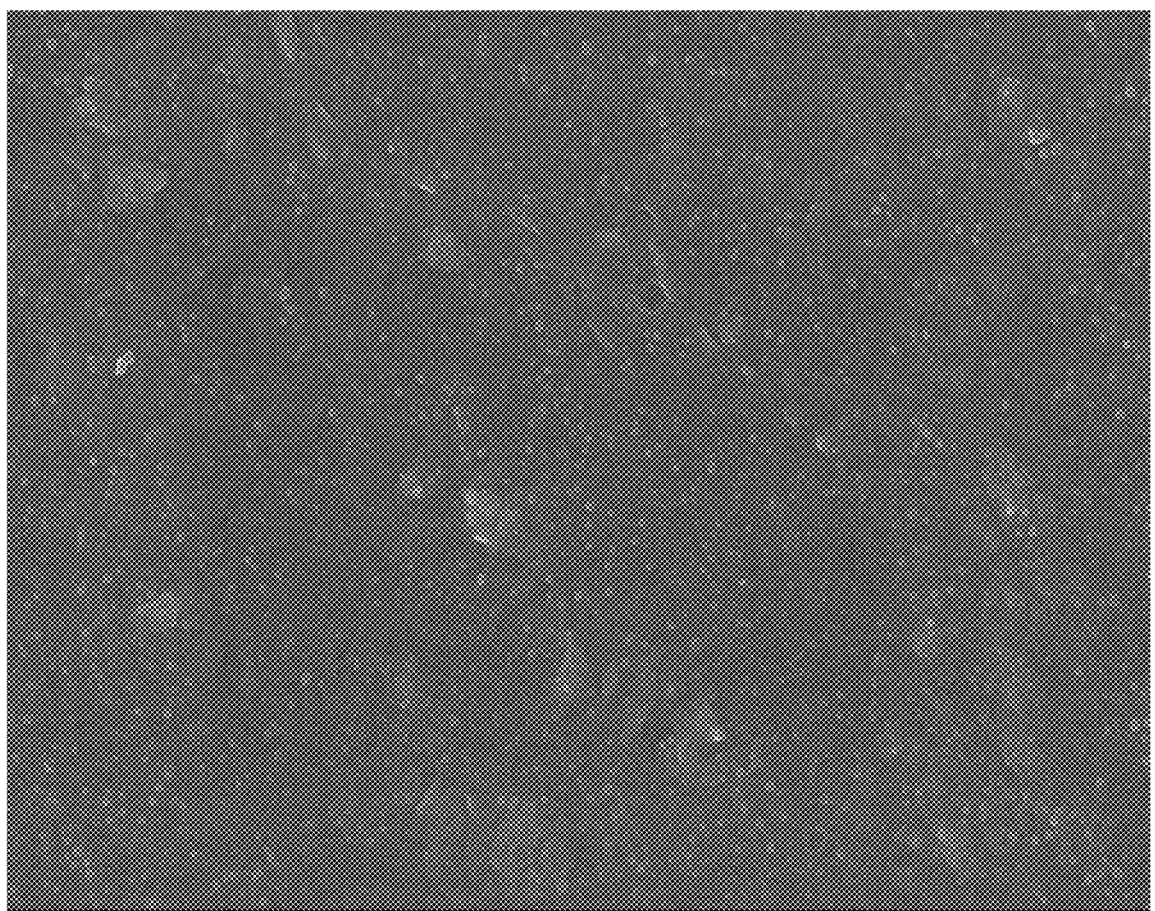

FIGS. 2A and 2B are scanning electron microscope (SEM) images before and after laser irradiation in Example 2. Referring to FIG. 2A, it can be seen that nickel nanoparticles are adsorbed as a single layer on the surface of a zinc substrate. Since citric acid, which is a surface modifier, mediates bonding between the zinc substrate and the nickel nanoparticles, the nickel nanoparticles may be adsorbed on the zinc substrate as a single layer. Referring to FIG. 2B, upon laser irradiation, fusion and an alloying reaction occur between a nickel nanoparticle layer that absorbs light energy and the surface layer of the zinc substrate, and as a result, the nickel nanoparticles diffuse into the inside of the zinc substrate. As such, the nickel nanoparticles and a part of the zinc substrate included in the surface functional layer of the surface-functionalized zinc foil are integrated and cannot be distinguished by a SEM image.

Figure 2C:
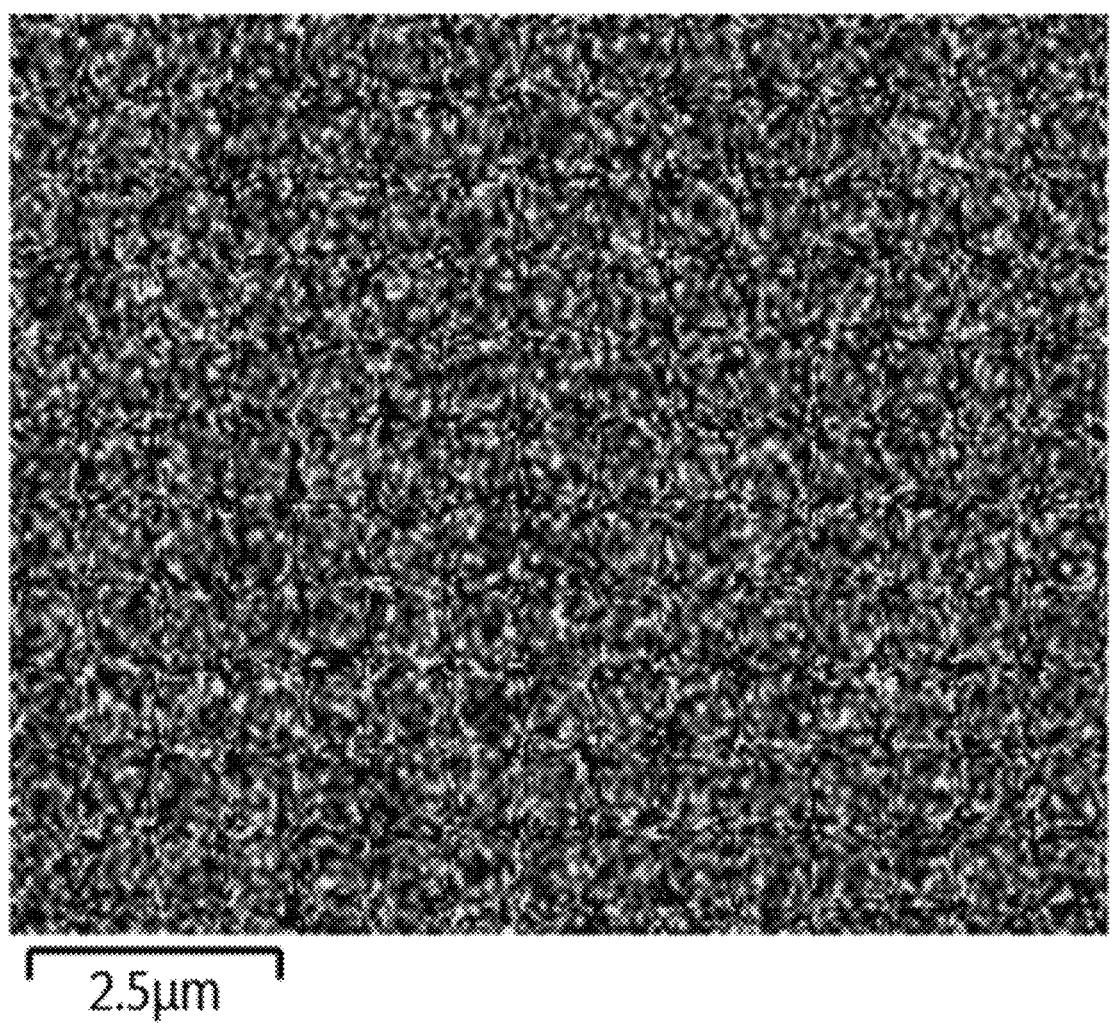
FIGS. 2C and 2D are energy-dispersive X-ray spectroscope (EDS) images after laser irradiation in Example 2.
Figure 2D:
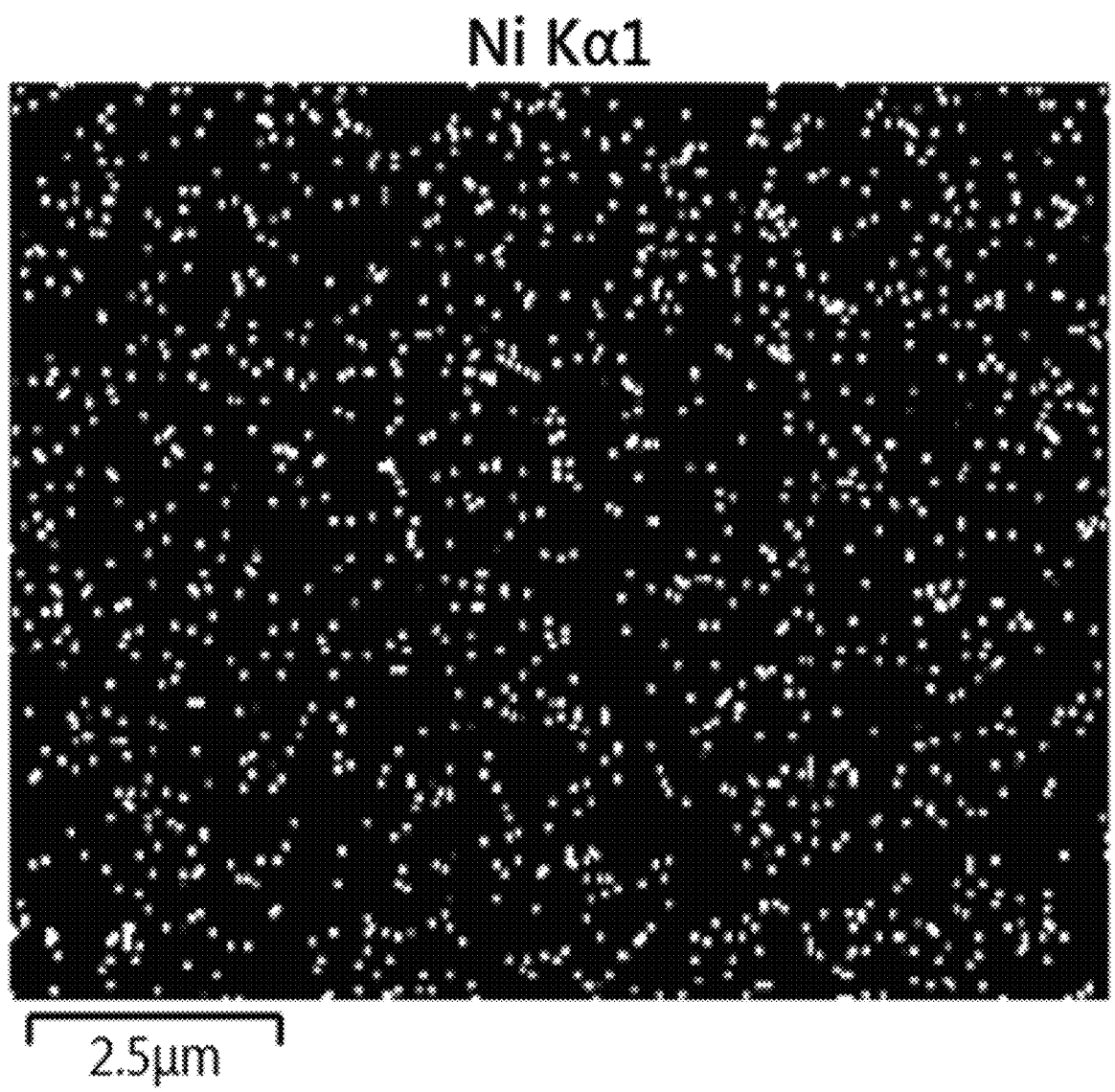

FIGS. 2C and 2D are energy-dispersive X-ray spectroscope (EDS) images after irradiating the product of Example 2 with laser.

FIG. 2C is an image of detected zinc (Zn) elements, and FIG. 2D is an image of detected nickel (Ni) elements. Referring to FIGS. 2C and 2D, it can be confirmed that nickel elements were detected in the zinc foil after being irradiated with laser. Based on these results, in the SEM image of FIG. 2C, the nickel nanoparticles cannot be distinguished on the surface of the substrate, but it can be seen that the nickel nanoparticles are diffused into the zinc foil.

Figure 3A:
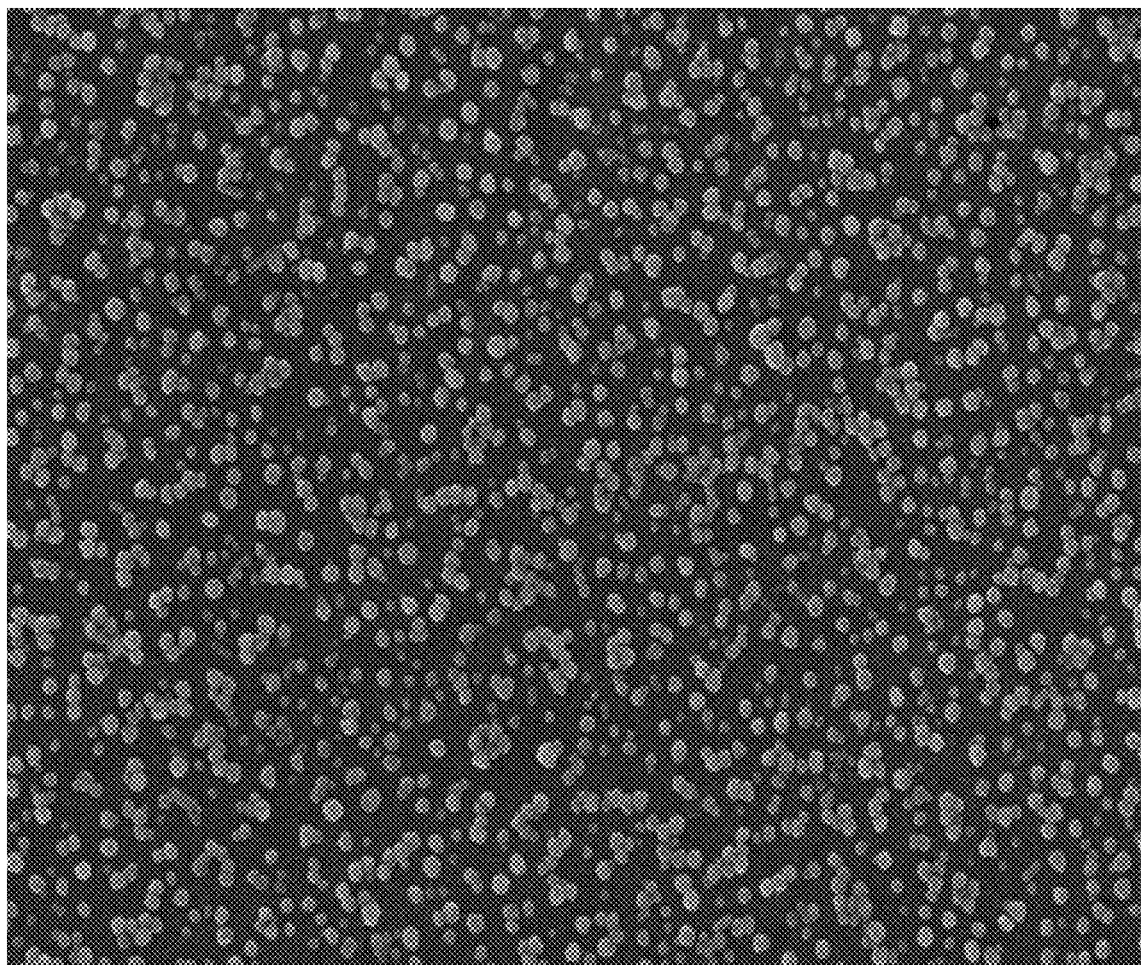
FIGS. 3A and 3B are scanning electron microscope (SEM) images before and after laser irradiation in Example 3.
Figure 3B:
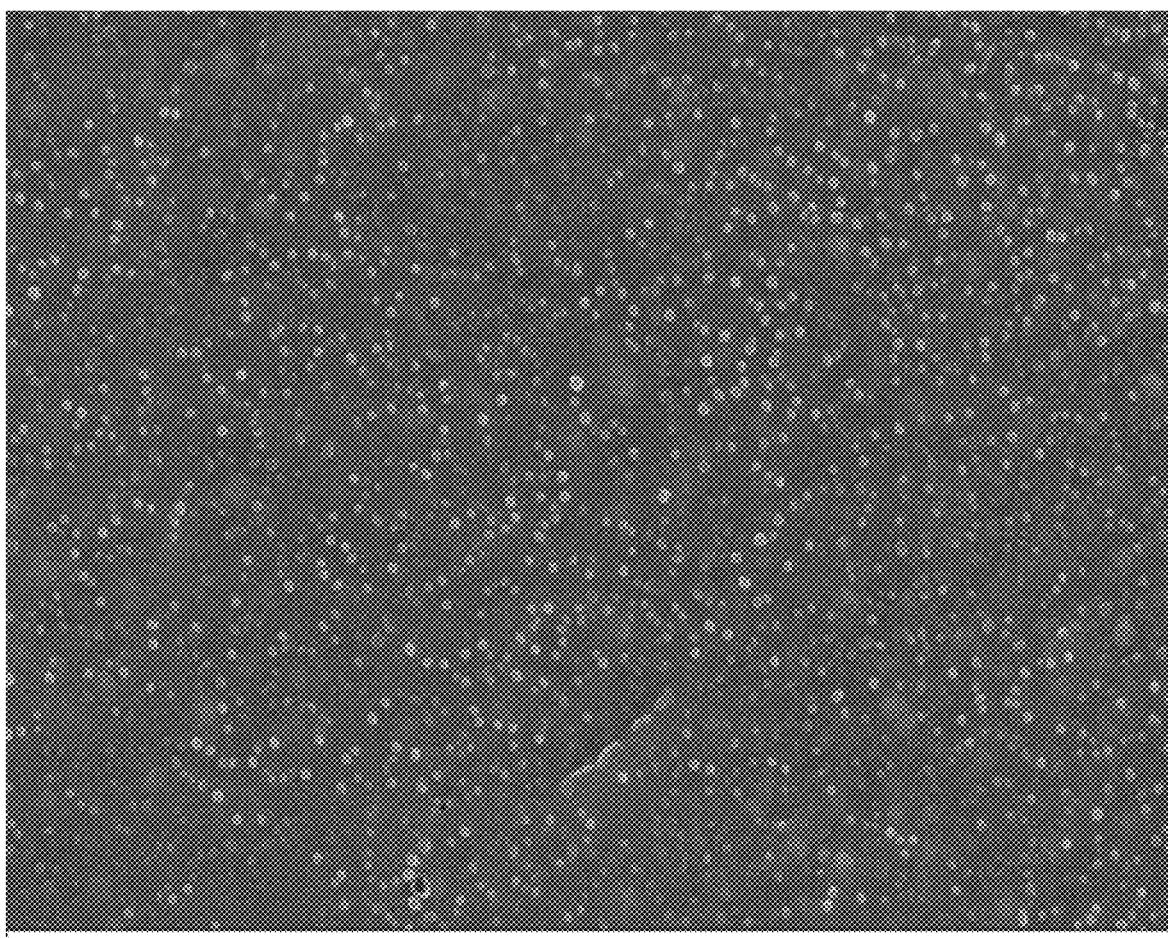

FIGS. 3A and 3B are scanning electron microscope (SEM) images before and after laser irradiation in Example 3. Referring to FIG. 3A, it can be seen that silver nanoparticles are adsorbed as a single layer on the surface of a copper substrate. Since citric acid, which is a surface modifier, mediates bonding between the copper substrate and the silver nanoparticles, the silver nanoparticles may be adsorbed on the copper substrate as a single layer. Referring to FIG. 3B, upon laser irradiation, fusion and an alloying reaction occur between a silver nanoparticle layer that absorbs light energy and the surface layer of the copper substrate, and as a result, the silver nanoparticles diffuse into the inside of the copper substrate. As such, the silver nanoparticles and a part of the copper substrate included in the surface functional layer of the surface-functionalized copper foil are not integrated as in Examples 1 and 2, but it can be seen that the number of silver nanoparticles on the substrate surface is reduced compared to before laser irradiation.

Figure 3C:
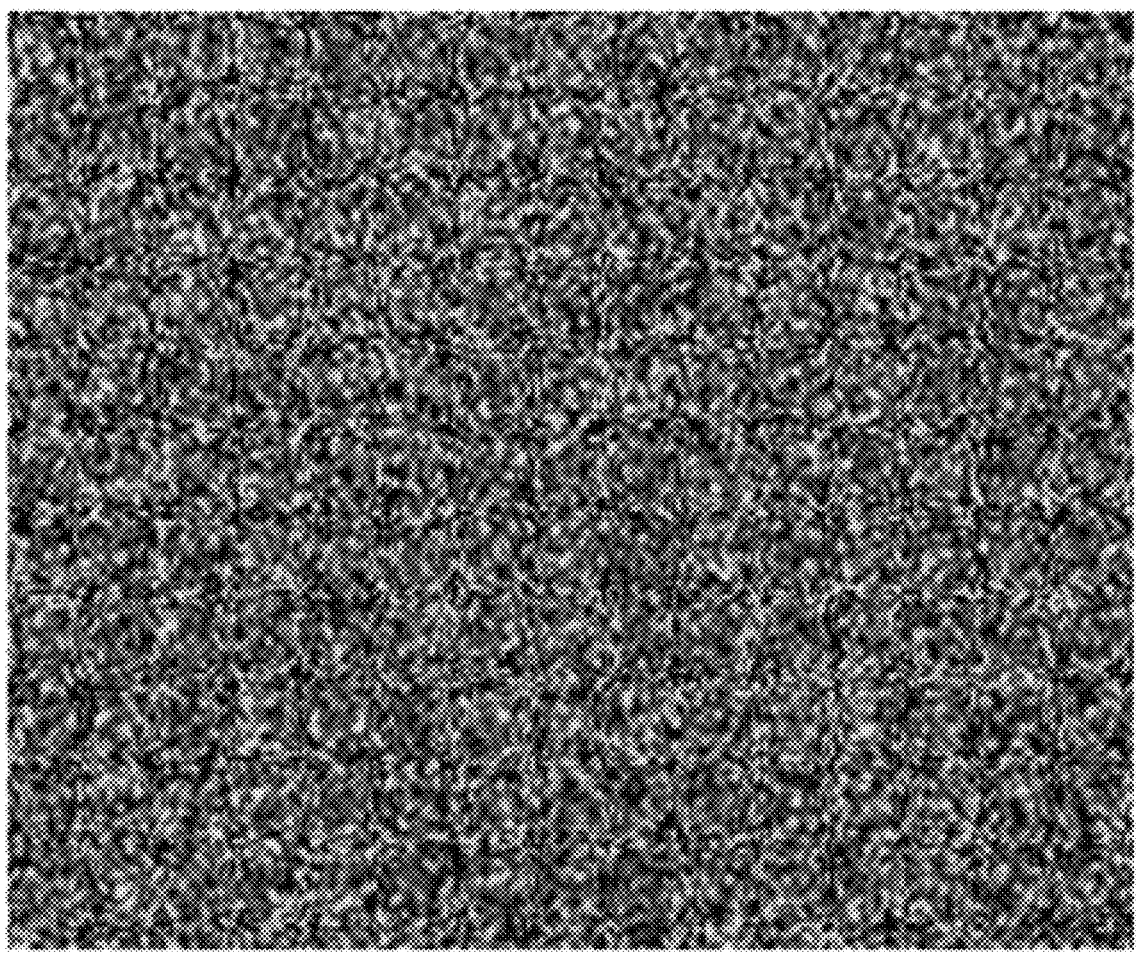
FIGS. 3C and 3D are energy-dispersive X-ray spectroscope (EDS) images after irradiating the product of Example 3 with laser.
Figure 3D:
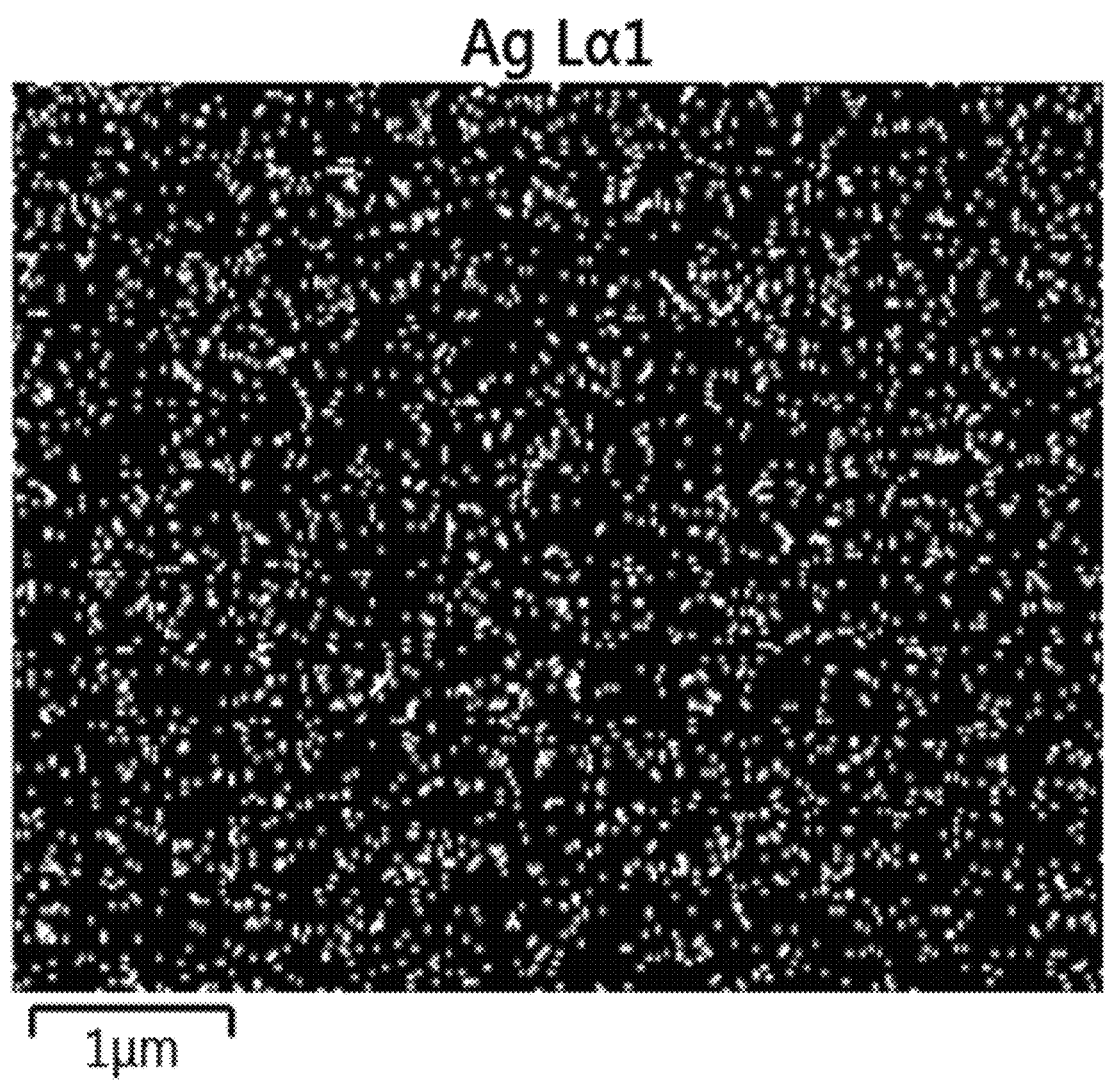

FIGS. 3C and 3D are energy-dispersive X-ray spectroscope (EDS) images after irradiating the product of Example 3 with laser.

FIG. 3C is an image of detected copper (Cu) elements, and FIG. 3D is an image of detected silver (Ag) elements. Referring to FIGS. 3C and 3D, it can be confirmed that silver elements were detected in the copper foil after being irradiated with laser. Based on these results, it can be seen that the silver nanoparticles diffused into the inside of the copper foil.

According to one embodiment of the present disclosure, through light firing using a single layer of metal nanoparticles, the same effect as heat treatment can be obtained in a short time.

According to one embodiment of the present disclosure, metal nanoparticles can impart functionality to a metal substrate by forming an alloy with a part of the metal substrate in contact with the metal nanoparticles.

Although the present disclosure has been described through limited examples and figures, the present disclosure is not intended to be limited to the examples. Those skilled in the art will appreciate that various modifications, additions, and substitutions are possible, without departing from the scope and spirit of the disclosure. Therefore, the scope of the present disclosure should not be limited by the embodiments, but should be determined by the following claims and equivalents to the following claims.

What is claimed is:

1. A method of preparing a surface-functionalized metal foil, the method comprising:
   preparing a surface-modified metal substrate using a first surface modifier;
   preparing surface-modified metal nanoparticles using a second surface modifier;
   immersing the surface-modified metal substrate in a dispersion containing the surface-modified metal nanoparticles to adsorb the surface-modified metal nanoparticles as a single layer on the surface-modified metal substrate; and
   drying the surface-modified metal substrate on which the surface-modified metal nanoparticles are adsorbed and performing light firing of the surface-modified metal nanoparticles to form a surface functional layer, the light firing including:
      forming an alloy containing at least one element of the surface-modified metal substrate in the surface-modified metal nanoparticles,
      forming an alloy containing at least one element of the surface-modified metal nanoparticles in the surface-modified metal substrate, and
      the at least one element of the surface-modified metal nanoparticles being diffused into the surface-modified metal substrate as a whole and forming a metal alloy containing the at least one element of the surface-modified metal nanoparticles,
   wherein the second surface modifier is a polymer having one or more selected from the group consisting of a carboxyl group, an amine group, an imine group, a hydroxyl group, and a carbonyl group.

2. The method according to claim 1, wherein the surface-modified metal nanoparticles are adsorbed at a rate of 10% to 95% based on a total area of the surface-modified metal substrate.

3. The method according to claim 1, wherein metal nanoparticles have a diameter of 10 nm to 200 nm.

4. The method according to claim 1, wherein metal nanoparticles comprise any one selected from the group consisting of gold, silver, copper, nickel, tin, and an alloy composition thereof.

5. The method according to claim 1, wherein metal substrate comprises any one selected from the group consisting of zinc (Zn), copper (Cu), nickel (Ni), aluminum (Al), stainless steel, titanium (Ti), molybdenum (Mo), gold (Au), and platinum (Pt).

6. The method according to claim 1, wherein the first surface modifier is an organic molecule having one or more selected from the group consisting of a carboxyl group, an amine group, an imine group, a hydroxyl group, and a carbonyl group or a polymer having one or more selected from the group consisting of a carboxyl group, an amine group, an imine group, a hydroxyl group, and a carbonyl group.

7. The method according to claim 1, wherein, in the immersing, the surface-modified metal substrate is immersed in the dispersion containing the surface-modified metal nanoparticles for 10 minutes to 12 hours.

8. The method according to claim 1, wherein the light firing is performed under a general atmosphere.

* * * * *